Figure 1:
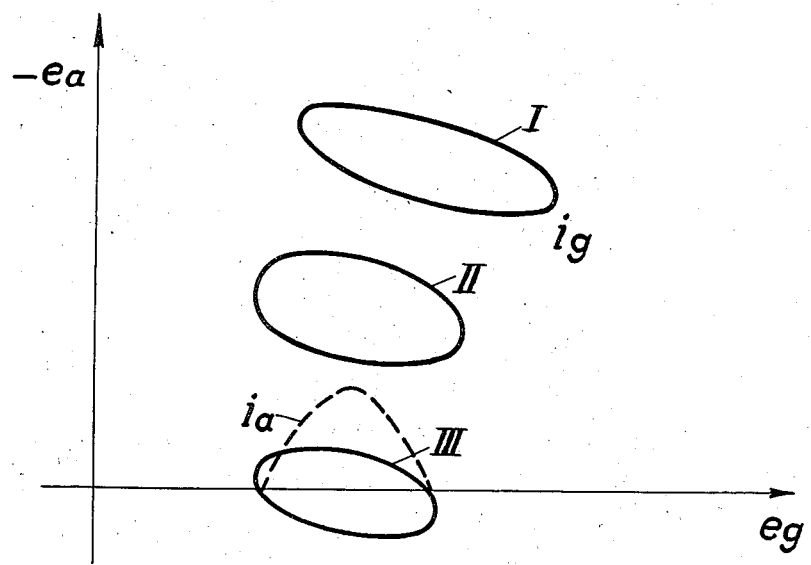

Dec. 15, 1936. W. DÄLLENBACH 2,064,242
RADIO RECEIVING SET FOR ULTRA-SHORT WAVES
Filed July 18, 1933. 2 Sheets-Sheet 1

Inventor.
W. Dallenbach
By Mahnrewsh
atty

Dec. 15, 1936.  W. DÄLLENBACH  2,064,242
RADIO RECEIVING SET FOR ULTRA-SHORT WAVES
Filed July 18, 1933  2 Sheets-Sheet 2
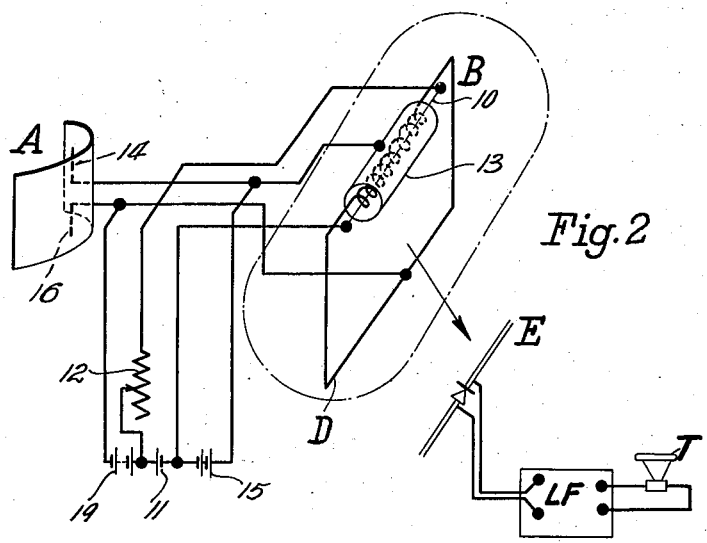
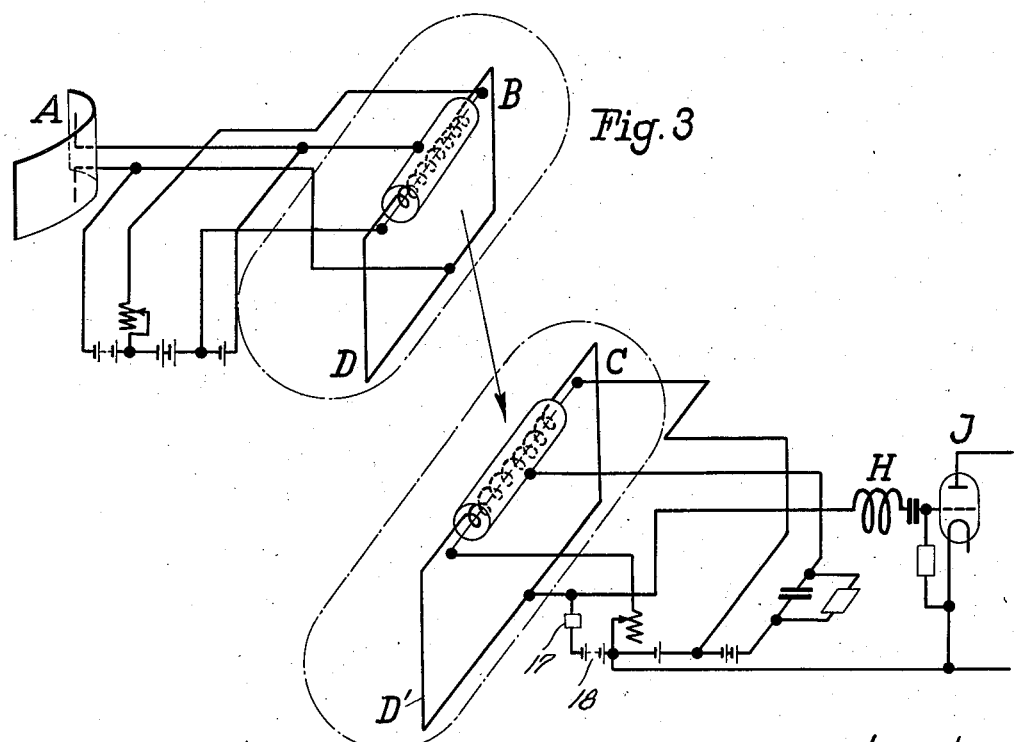
Inventor:
W. Dällenbach Patented Dec. 15, 1936

2,064,242

UNITED STATES PATENT OFFICE 2,064,242

RADIO RECEIVING SET FOR ULTRA-SHORT WAVES

Walter Dällenbach, Berlin-Charlottenburg, Germany, assignor to N. V. Machinerieen-en Apparaten Fabrieken "Meaf", Utrecht, Netherlands Application July 18, 1933, Serial No. 680,999
In Germany June 2, 1932

6 Claims. (Cl. 250—15)

An object of the present invention is to effect at receiving stations for ultra-short waves an ultra-high frequency amplification instead of the hitherto known audion reception. A strongly undamped ultra-short wave resonance circuit is used for the ultra-high frequency amplification.

A further object of the invention is to transmit without coupling elements by radiation to a secondary circuit the ultra-high frequency oscillation produced in the undamped primary circuit, the said secondary circuit comprising an electric or magnetic dipole or oscillatory circuits coupled with audion tubes.

A further object of the invention is to use as ultra-high frequency amplifier a tube in breaking connection, the brake electrode voltage of which is so negatively selected that no brake electrode current is produced.

The invention relates to a radio receiving set and more particularly to an apparatus of this type to be used with ultra-short electric waves. In ultra-short-wave transmitter tubes, especially in the case of the so-called braked-field arrangement, it is sometimes stated that under definite operating conditions by themselves favorable for transmission, no anode current is available as the whole emission current flows from the cathode to the grid. When such a valve is to be used for reception in a condition adjusted in the neighbourhood of the start of oscillation, it is found that, in contrast to the usual phenomenon, the particular valve can no more be connected through an electrode to the receiving apparatus proper as the oscillations produced by the foreign waves taken up are not able to result in any modification of the current flowing through the electrode, which modifications could e. g. be used for influencing the low-frequency amplifier.

It is an object of the present invention to obviate this drawback by the provision of a radio receiving set which is adapted to couple the valve by the radiation which it is sending out, to the low-frequency amplifier or another receiving apparatus, especially in case the anode current is not available with the oscillating valve.

According to the invention, the receiving set as a whole also comprises a receiving antenna closely coupled by radiation to the receiving valve (primary receiver) and placed in the neighbourhood thereof, which antenna is further connected to a suitable receiving apparatus proper (secondary receiver), for instance a detector with galvanometer, a telephone, an audion or an oscillating audion.

Figure 1 shows oscillation characteristics of ultra-short wave tubes in the braking connection by way of example. In the braking connection (Barkhausen short connection), the grid electrode has a positive voltage and the anode or brake electrode a negative voltage. The ultra-short wave tubes show oscillations only within certain ranges of the positive grid voltage and the negative brake electrode voltages. These ranges of oscillation are shown by the curves I, II, III. The abscissa of the diagram represents the grid voltage and the ordinate the negative brake electrode voltage. Consequently, in the case of a certain emission of the incandescent cathode, oscillations can only be produced on the electrodes of the tubes in connection with voltages within such a closed range.

It has been found experimentally that for the range of oscillation III there is produced an anode current the curve of which, as plotted against the grid voltage, approximately has the shape represented by a dotted line and marked by $i_a$, in case an anode voltage is nil. As to the ranges of oscillation I and II, a corresponding anode current is not available. But exactly these ranges of oscillation, and more particularly that marked by I, are best suited for reception as the use thereof results in a higher sensitiveness to reception. Now when the valve within the range of oscillation I is caused to oscillate by a radiation taken up, provided that the operating conditions, such as anode and grid voltages and current of emission, are suitably chosen, the oscillation produced will not result in an anode current or a modification of such an anode current but only in a radiation sent into the space by the said valve. This space radiation may however be taken up by a di-pole detector placed at a suitable distance from the valve serving as a primary receiver. By a telephone the wave to be received may be rendered audible in case the same is correspondingly modulated.

Both the primary and the secondary receivers may include magnetic or electric di-poles. But a combination thereof could be used just as well, one of the di-poles used being magnetic and the other di-pole electric.

Figures 2 and 3 show several embodiments of the present invention.

In Fig. 2, A is a wave receiver, for instance, a dipole lodged in a reflector, the oscillations thereof being transmitted to an ultra-short wave valve. This valve is a three-electrode valve which operates in the so-called braked-field arrangement (for instance, in the range I shown by Figure 1) disclosed for the first time by Barkhausen and Kurz. The cathode 10 of the valve is supplied by a heating battery 11 across a regulating resistance 12. The spiral grid electrode surrounding the cathode is connected at its ends to a wire loop D which is also located within the valve, one half 16 of the receiving dipole being connected in the middle of the wire loop. A grid battery 19 imparts to the grid electrode a positive potential relative to the cathode. The plate electrode or brake electrode 13 is connected to the other half 14 of the dipole and receives through the battery 15 a slightly negative potential relative to the cathode. The voltage $e_g$ of the battery 19 and the voltage $e_a$ of the battery 15 are so selected that the operating point of the valve is located on the boundary of the working range I according to Figure 1 so that the valve does not oscillate as long as its wave receiver A is not subjected to oscillations. If the antenna A is subjected to the radiation of the transmitting station, the potentials of the electrodes, to which the receiving dipole is connected, vary and swing about the operating point previously adjusted on the boundary of a range of oscillation such as I.

Consequently, the oscillatory circuit formed of the grid spiral and the loop D is subjected to oscillations, the amplitudes thereof being proportional to the amplitudes of the oscillations received at A but amplified relatively thereto. The oscillatory currents in the said oscillatory circuit within the valve produce a field alternating with high frequency, the said field expanding in the space and extending to the receiving antenna E of the secondary receiver in the immediate vicinity, the said secondary receiver being provided with a detector. The oscillations rectified by the detector are transmitted in the usual manner across a low frequency amplifier LF to a telephone receiver T.

Figure 3 shows a similar arrangement. The primary receiver consisting of a transmitter valve BD in a braked-field connection or arrangement is exactly the same as that used in the arrangement according to Figure 2. However, an audion valve C serves as secondary receiver and the tuned oscillatory circuit of this valve is also formed of the grid spiral with connected wire loop D' located within the valve. In the embodiment shown, this oscillatory circuit simultaneously serves as receiving antenna according to a so-called magnetic dipole which is a circular conductor mainly influenced by the magnetic lines of force of the radiation field. If this oscillatory circuit is subjected to the radiation from the transmitter valve serving as primary receiver, low frequency voltage fluctuations occur at the resistance 17 in the battery circuit of the grid battery 18 and are transmitted in the usual manner to the grid of an amplifier valve J. The transmission takes place across a self-inductance H which shuts off the ultra-high frequency from the valve J.

The transmitting valve serving as primary receiver or the undamped and radiating oscillatory circuit constitutes a high frequency amplifier, and the gist of the invention resides therein.

I claim—

1. In an arrangement for receiving electrical energy of ultra-short waves, a primary receiver including an electron tube having cathode, anode and grid electrodes connected in braking field manner, an oscillating circuit within said tube formed in part by the electrodes thereof and adapted to produce, independently, space radiations of high frequency oscillations corresponding in frequency to the waves to be received, an antenna connected to the electrodes of said tube for receiving and applying to the tube said electrical energy whereby oscillations are generated in said oscillatory circuit, a secondary receiver and a secondary antenna therefor, the latter being positioned in the field of space radiation of the high frequency oscillations generated in the oscillatory circuit of the first tube.

2. In an arrangement as claimed in claim 1, each of the antennae being dipoles.

3. In an arrangement as claimed in claim 1, said secondary receiver comprising a detector and said secondary antenna being connected thereto and being positioned in the field of space radiation of the high frequency oscillations generated in the oscillatory circuit of the first tube, whereby high frequency energy may be transferred directly from the oscillatory circuit in said tube to said secondary antenna.

4. In an arrangement for receiving electrical energy of ultra-short waves, an electron tube including cathode, anode and grid electrodes connected in braking field manner, an oscillatory circuit within said tube formed in part by the grid electrode of said tube and adapted to produce, independently, space radiation of high frequency oscillations corresponding in frequency to the waves to be received, an antenna connected with the electrodes of said tube for receiving said electrical energy and applying it to said electrodes, whereby oscillations are generated in said oscillatory circuit, a second electron tube including anode, cathode and grid electrodes connected in braking field manner, said electrodes being positioned in the field of space radiation of the high frequency oscillations generated in the oscillatory circuit of the first tube and being adapted to act as a secondary antenna.

5. In an arrangement for receiving electrical energy of ultra-short waves, an electron tube including cathode, anode and grid electrodes connected in braking field manner, an oscillatory circuit within said tube formed in part by the grid electrode of said tube and adapted to produce, independently, space radiation of high frequency oscillations corresponding in frequency to the waves to be received, an antenna connected with the electrodes of said tube for exciting said oscillatory circuit into a state of oscillation in response to received waves, a second electron tube including anode, cathode and grid electrodes connected in braking field manner, said electrodes being positioned in the field of space radiation of the high frequency oscillations generated in the oscillatory circuit of the first tube and being adapted to act as a secondary antenna.

6. In an arrangement for receiving electrical energy of ultra-short waves, an electron tube including cathode, anode and grid electrodes connected in braking field manner, an oscillatory circuit within said tube formed in part by the grid electrode of said tube and adapted to produce, independently, space radiation of high frequency oscillations corresponding in frequency to the waves to be received, an antenna connected with the electrodes of said tube for receiving said electrical energy and applying it to said electrodes, whereby oscillations are generated in said oscillatory circuit, a second electron tube including anode, cathode and grid electrodes connected in braking field manner, an oscillatory circuit within said second tube formed in part by the electrodes of said tube, the oscillatory circuit of said second tube being positioned in the field of high frequency oscillations generated in the oscillatory circuit of the first tube, whereby high frequency energy may be transferred directly from the oscillatory circuit in said first tube to the oscillatory circuit of said second tube.

WALTER DÄLLENBACH.